US012802374B2

(12) United States Patent
Song

(10) Patent No.: US 12,802,374 B2
(45) Date of Patent: Nov. 17, 2026

(54) VIRTUAL PROP PROCESSING METHOD AND APPARATUS, DEVICE, AND STORAGE MEDIUM

(71) Applicant: BEIJING BYTEDANCE NETWORK TECHNOLOGY CO., LTD., Beijing (CN)

(72) Inventor: Li Song, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 190 days.

(21) Appl. No.: 18/708,169

(22) PCT Filed: Nov. 2, 2022

(86) PCT No.: PCT/CN2022/129164
§ 371 (c)(1),
(2) Date: May 7, 2024

(87) PCT Pub. No.: WO2023/078280
PCT Pub. Date: May 11, 2023

(65) Prior Publication Data

US 2025/0014296 A1 Jan. 9, 2025

(30) Foreign Application Priority Data

Nov. 8, 2021 (CN) ......................... 202111315418.8

(51) Int. Cl.

| | |
|---|---|
| ***G06T 19/20*** | (2011.01) |
| ***G06T 7/73*** | (2017.01) |
| ***G06T 19/00*** | (2011.01) |

(52) U.S. Cl.
CPC ................ *G06T 19/20* (2013.01); *G06T 7/73* (2017.01); *G06T 19/006* (2013.01); *G06T 2207/30201* (2013.01); *G06T 2219/2004* (2013.01)

(58) Field of Classification Search
CPC ......... G06T 19/20; G06T 7/73; G06T 19/006; G06T 2207/30201
(Continued)

(56) References Cited

U.S. PATENT DOCUMENTS 10,217,286 B1 2/2019 Angel et al.
11,069,094 B1 * 7/2021 Evangelista ............ G06T 11/60
(Continued)

FOREIGN PATENT DOCUMENTS

CN 104217350 A 12/2014
CN 108492247 A 9/2018
(Continued)

OTHER PUBLICATIONS

International Patent Application No. PCT/CN2022/129164; Int'l Written Opinion and Search Report; dated Jan. 17, 2023; 7 pages.
(Continued)

*Primary Examiner* — Thomas J Lett
(74) *Attorney, Agent, or Firm* — BakerHostetler

(57) ABSTRACT

Described herein are techniques for processing a virtual prop. The techniques comprise acquiring target positions of a first type of position vertexes of a virtual prop based on three-dimensional face vertex data; determining target positions of a second type of position vertexes of the virtual prop based on a pose change of a target object corresponding to the virtual prop, attribute information of the virtual prop and a morphological parameter of the virtual prop in an initial frame; acquiring target positions of the vertexes of the virtual prop in a current frame based on the target positions
(Continued)

of the first type of position vertexes, the target positions of the second type of position vertexes and position information of the vertexes of the virtual prop in a historical frame; and displaying the virtual prop in the current frame.

19 Claims, 9 Drawing Sheets

(58) Field of Classification Search
USPC .......................................................... 345/419
See application file for complete search history.

(56) References Cited

U.S. PATENT DOCUMENTS

| | | | | |
|---|---|---|---|---|
| 2017/0154470 | A1 | 6/2017 | Zhang | |
| 2019/0026907 | A1* | 1/2019 | Abreu | G06T 7/75 |
| 2021/0043000 | A1 | 2/2021 | Chen et al. | |
| 2021/0312685 | A1 | 10/2021 | Guo et al. | |
| 2024/0216802 | A1 | 7/2024 | Zheng et al. | |
| 2025/0278899 | A1* | 9/2025 | Bell-Geddes | G06T 17/20 |

FOREIGN PATENT DOCUMENTS

| | | | |
|---|---|---|---|
| CN | 111760265 | A | 10/2020 |
| CN | 112148622 | A | 12/2020 |
| CN | 112150638 | A | 12/2020 |
| CN | 113986015 | A | 1/2022 |

OTHER PUBLICATIONS

China Patent Application No. 202111315418.8; Office Action; dated Sep. 22, 2023; 11 pages.

* cited by examiner

VIRTUAL PROP PROCESSING METHOD AND APPARATUS, DEVICE, AND STORAGE MEDIUM

CROSS-REFERENCE TO RELATED APPLICATIONS

The present application is a national phase application of PCT/CN2022/129164 filed Dec. 2, 2022, which claims priority to and is based on the Chinese application No. 202111315418.8 filed on Nov. 8, 2021, entitled "VIRTUAL PROP PROCESSING METHOD AND APPARATUS, DEVICE, AND STORAGE MEDIUM", which are hereby incorporated by reference in their entireties.

FIELD OF THE INVENTION

The present disclosure relates to the field of multimedia technology, and in particular, to a virtual prop processing method, apparatus, device, and storage medium.

BACKGROUND

In interactive applications (APPs) such as live video streaming and photographing, a virtual prop is usually set up to enhance the fun of live video streaming and photographing, and to help to increase the interactivity between users.

In the prior art, the virtual prop can be virtual eyelashes, virtual text, virtual makeup, virtual scenes, etc., taking virtual eyelashes as an example, the current virtual eyelash technology utilizes two eyelash models with fixed models to present virtual eyelashes.

DISCLOSURE OF THE INVENTION

In order to solve the above technical problem, the present disclosure provides a virtual prop processing method, apparatus, device, and storage medium, which can improve the display effects of virtual props.

In a first aspect, the present disclosure provides a method for processing a virtual prop, including:

- on the basis of three-dimensional face vertex data, acquiring target positions of a first type of position vertexes of the virtual prop;
- on the basis of a posture change of a target object corresponding to the virtual prop, attribute information of the virtual prop, and a morphological parameter of the virtual prop in an initial frame, determining target positions of a second type of position vertexes of the virtual prop;
- on the basis of the target positions of the first type of position vertexes, the target positions of the second type of position vertexes, and position information of the vertexes of the virtual prop in a historical frame, acquiring target positions of the vertexes of the virtual prop in a current frame; and
- displaying the virtual prop in the current frame, on the basis of the target positions of the vertexes of the virtual prop in the current frame.

According to some embodiments of the present disclosure, on the basis of the target positions of the first type of position vertexes, the target positions of the second type of position vertexes, and position information of the vertexes of the virtual prop in a historical frame, acquiring target positions of the vertexes of the virtual prop in a current frame, includes:

- on the basis of the target positions of the first type of position vertexes, the target positions of the second type of position vertexes, position information of vertexes in an initial mesh, and position information of vertexes in a previous frame mesh, acquiring the target positions of the vertexes of the virtual prop in the current frame, wherein the initial mesh is a mesh composed of vertexes of the virtual prop in an initial frame, and the previous frame mesh is a mesh composed of vertexes in the virtual prop in a previous frame.

According to some embodiments of the present disclosure, on the basis of the target positions of the first type of position vertexes, the target positions of the second type of position vertexes, position information of vertexes in an initial mesh, and position information of vertexes in a previous frame mesh, acquiring the target positions of the vertexes of the virtual prop in the current frame, including:

- in each iteration, for each third type of position vertex, on the basis of position information of vertexes in an initial mesh and position information of the third type of position vertexes in a previous iteration, acquiring a rotation matrix corresponding to third type of position vertexes in the current iteration, and on the basis of the rotation matrix, acquiring candidate positions corresponding to the third type of position vertexes in the current iteration, wherein initial values of position information of the third type of position vertexes in the previous iteration are position information of the third type of position vertexes in the previous frame mesh;
- on the basis of candidate positions corresponding to the third type of position vertexes in the current iteration, the position information of the vertexes in the initial mesh, and the position information of the vertexes in the previous frame mesh, determining target positions corresponding to the third type of position vertexes in the current frame;
- on the basis of the target positions of the first type of position vertexes, the target positions of the second type of position vertexes, and the target positions corresponding to the third type of position vertexes, acquiring the target positions of the vertexes of the virtual prop in the current frame.

According to some embodiments of the present disclosure, on the basis of position information of vertexes in an initial mesh and position information of the third type of position vertexes in a previous iteration, acquiring a rotation matrix corresponding to third type of position vertexes in the current iteration, including:

- on the basis of a principle of deformation energy minimization, acquiring a rotation matrix corresponding to the i-th third type of position vertex in the current iteration, according to formula (1):

$$E = \sum_{j \in N(i)} \omega_{ij} \left\| (p'_i - p'_j) - R_i(p_i - p_j) \right\|^2 \quad (1)$$

Among them, $j \in N(i)$ means that a third type of position vertex i is a point adjacent to a third type of position vertex j, $\omega_{ij}$ represents a weight value for an edge formed by the third type of position vertex i and the third type of position vertex j, $p_i$ represents the position of the third type of position vertex i in the initial mesh, $p_j$ represents the position of the third type of position vertex j in the initial mesh, $p'_i$ represents the position of the third type of position vertex i in the mesh in the previous iteration, $p'_j$ represents the position of the third type of position vertex j in the mesh in the previous iteration, $R_i$ is the rotation matrix corresponding to the third type of position vertex i in the current iteration.

According to some embodiments of the present disclosure, on the basis of candidate positions corresponding to the third type of position vertexes in the current iteration, the position information of the vertexes in the initial mesh, and the position information of the vertexes in the previous frame mesh, determining target positions corresponding to the third type of position vertexes in the current frame, include:

on the basis of candidate positions corresponding to the third type of position vertexes in the current iteration and the position information of the vertexes in the initial mesh, acquiring a total deformation energy of mesh in the current iteration, where the total deformation energy is used to characterize a degree of deformation of the mesh;

if the total deformation energy does not meet a preset condition, updating the candidate positions corresponding to the third type of position vertexes in the current iteration to candidate positions corresponding to the third type of position vertexes in the previous iteration, and returning to execution of acquiring a rotation matrix corresponding to third type of position vertexes in the current iteration on the basis of position information of vertexes in an initial mesh and position information of the third type of position vertexes in a previous iteration, until the total deformation energy of mesh in the current iteration meets the preset condition;

determining the candidate positions corresponding to the third type of position vertexes in the current iteration as the target positions corresponding to the third type of position vertexes in the current frame.

According to some embodiments of the present disclosure, on the basis of candidate positions corresponding to the third type of position vertexes in the current iteration and the position information of the vertexes in the initial mesh, acquiring a total deformation energy of mesh in the current iteration, includes:

acquiring the total deformation energy of mesh in the current iteration according to formula (2):

$$E = \Sigma_{i=1}^{n} \omega_i \Sigma_{j \in N(i)} \omega_{ij} \left\| (p_i' - p_j') - R_i(p_i - p_i) \right\|^2 \quad (2)$$

Among them, $j \in N(i)$ means that a third type of position vertex i is a point adjacent to a third type of position vertex j, $\omega_{ij}$ represents a weight value for an edge formed by the third type of position vertex i and the third type of position vertex j, $p_i$ represents the position of the third type of position vertex i in the initial mesh, $p_j$ represents the position of the third type of position vertex j in the initial mesh, $p'_i$ represents the position of the third type of position vertex i in the mesh in the previous iteration, $p'_j$ represents the position of the third type of position vertex j in the mesh in the previous iteration, $R_i$ is the rotation matrix corresponding to the third type of position vertex i in the current iteration.

According to some embodiments of the present disclosure, on the basis of candidate positions corresponding to the third type of position vertexes in the current iteration, the position information of the vertexes in the initial mesh, and the position information of the vertexes in the previous frame mesh, determining target positions corresponding to the third type of position vertexes in the current frame, include:

determining whether the current number of iterations meets a preset number, if it does not meet the preset number, updating the candidate positions corresponding to the third type of position vertexes in the current iteration to candidate positions corresponding to the third type of position vertexes in the previous iteration, and returning to execution of acquiring a rotation matrix corresponding to third type of position vertexes in the current iteration on the basis of position information of vertexes in an initial mesh and position information of the third type of position vertexes in a previous iteration, until the current number of iterations meets the preset number;

determining the candidate positions corresponding to the third type of position vertexes in the current iteration as the target positions corresponding to the third type of position vertexes in the current frame.

According to some embodiments of the present disclosure, on the basis of a posture change of a target object corresponding to the virtual prop, attribute information of the virtual prop, and a morphological parameter of the virtual prop in an initial frame, determining target positions of a second type of position vertexes of the virtual prop, includes:

acquiring a first posture change parameter on the basis of the posture change of the target object corresponding to the virtual prop;

acquiring a second posture change parameter of the virtual prop based on the first posture change parameter and the attribute information of the virtual prop;

acquiring a rotation matrix corresponding to the second posture change parameter;

determining a target morphological parameter based on the rotation matrix and the morphological parameter of the initial frame;

on the basis of the target morphological parameter and the target positions of the first type of position vertexes, acquiring the target positions of the second type of position vertexes of the virtual prop.

According to some embodiments of the present disclosure, the acquiring a first posture change parameter on the basis of the posture change of the target object corresponding to the virtual prop, includes:

acquiring the first posture change parameter based on a posture change distance of the target object and a normalization parameter.

According to some embodiments of the present disclosure, the virtual prop is eyelashes, and the target object is an eye.

In a second aspect, the present disclosure provides an apparatus for processing a virtual prop, including:

a determination module configured to, on the basis of three-dimensional face vertex data, acquire target positions of a first type of position vertexes of the virtual prop; on the basis of a posture change of a target object corresponding to the virtual prop, attribute information of the virtual prop, and a morphological parameter of the virtual prop in an initial frame, determine target positions of a second type of position vertexes of the virtual prop; on the basis of the target positions of the first type of position vertexes, the target positions of the second type of position vertexes, and position information of the vertexes of the virtual prop in a historical frame, acquire target positions of the vertexes of the virtual prop in a current frame; and a displaying module configured to display the virtual prop in the current frame, on the basis of the target positions of the vertexes of the virtual prop in the current frame.

In a third aspect, the present disclosure provides an electronic device, including: a processor and a memory, the memory storing a computer program which, when executed by the processor, implements the steps of the methods as described in the first aspect.

In a fourth aspect, the present disclosure provides a computer-readable storage medium on which a computer program is stored, wherein the computer program, when executed by a processor, implements the steps of the methods as described in the first aspect.

In a fifth aspect, the present disclosure provides a computer program product, which, when running on a computer, causes the computer to perform the methods as described in the first aspect.

In a sixth aspect, the present disclosure provides a computer program, the computer program comprising program codes that, when executed by a computer, causes the computer to perform the method of the first aspect or any embodiment of the present disclosure.

DESCRIPTION OF THE DRAWINGS

The accompanying drawings, which are incorporated in and constitute a part of the present specification, illustrate embodiments of the present disclosure, and serve to explain the principles of the present disclosure together with the specification.

In order to more clearly illustrate the embodiments of the present disclosure or technical solutions in the prior art, the drawings needed to be used in the description of the embodiments or the prior art will be briefly introduced below, obviously, for those of ordinary skill in the art, other drawings can be obtained based on these drawings without paying any creative labor.

DETAILED DESCRIPTION OF PREFERRED EMBODIMENTS

Figure 1:
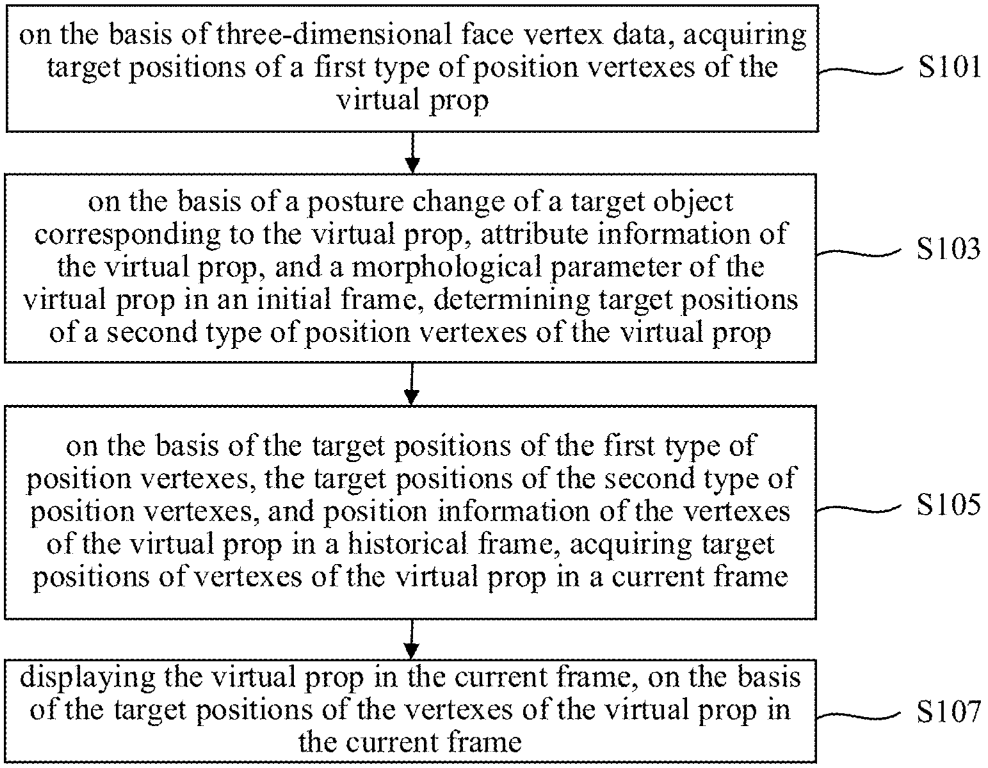
FIG. 1 is a schematic flowchart of a method of processing a virtual prop provided by the present disclosure.

In order to be able to understand the above objects, features and advantages of the present disclosure more clearly, the solutions of the present disclosure will be further described below. It should be noted that the embodiments of the present disclosure and the features in the embodiments can be combined with each other without conflict.

In the following description, numerous specific details are set forth in order to provide a thorough understanding of the present disclosure, but the present disclosure may be practiced in other ways than as described herein; obviously, the embodiments in the specification are only a part of the embodiments of the present disclosure, but not all of the embodiments.

The technical solution of the present disclosure can be applied to a terminal device with a display screen and a camera, the display screen may be or be not a touch screen, and the terminal device may include a tablet, a mobile phone, a wearable electronic device, a smart home appliance, or any other terminal device, etc. The terminal device is installed with an application (APP), and the application can display a virtual prop.

However, using the methods in the prior art, key points of a virtual prop and the user's face cannot be accurately absorbed to each other, resulting in a poor display effect of the virtual prop.

In view of this, there is proposed an improved solution of processing a virtual prop. In the technical solution provided by the present disclosure, by means of, on the basis of three-dimensional face vertex data, acquiring target positions of a first type of position vertexes of the virtual prop; on the basis of a posture change of a target object corresponding to the virtual prop, attribute information of the virtual prop, and a morphological parameter of the virtual prop in an initial frame, determining target positions of a second type of position vertexes of the virtual prop; on the basis of the target positions of the first type of position vertexes, the target positions of the second type of position vertexes, and position information of the vertexes of the virtual prop in a historical frame, acquiring target positions of the vertexes of the virtual prop in a current frame; and displaying the virtual prop in the current frame, on the basis of the target positions of the vertexes of the virtual prop in the current frame, it is possible to determine morphology of the virtual prop in the current frame based on the three-dimensional face vertex data, the posture change of the target object, the attribute information of the virtual prop, and the morphology of the virtual prop in a historical frame, so that the virtual prop in the current frame can better fit the target object and improve the display effect of the virtual prop.

Three-dimensional face vertexes in the present disclosure may include face key points, and optionally, may also include points obtained by interpolation based on the face key points; the three-dimensional face vertex data are used to reconstruct the face in the present disclosure.

The virtual prop in the present disclosure may be virtual eyelashes, virtual text, virtual makeup, etc., which is not limited in the present disclosure. Taking virtual eyelashes as an example, the first type of position vertexes in the present disclosure can be the nodes at eyelash roots, the second type of position vertexes can be nodes at eyelash tips, the target object in the present disclosure can be the eye, and the morphological parameter in the present disclosure can be a blink degree, the attribute information in the present disclosure may be eyelash flip sensitivity, eyelash flip maximum angle, etc., and the target positions of the present disclosure may be coordinates.

The virtual prop in the present disclosure may be virtual eyelashes, virtual text, virtual makeup, etc., in the following specific embodiments, virtual eyelashes are taken as an example to describe the technical solution of the present disclosure in detail.

FIG. 1 is a schematic flowchart of a method of processing a virtual prop provided by the present disclosure. As shown in FIG. 1, the method of the present embodiment is as follows:

S101. on the basis of three-dimensional face vertex data, acquiring target positions of a first type of position vertexes of the virtual prop.

A user's three-dimensional face image can be captured through a camera in real time, and real-time data of the three-dimensional face vertexes can be acquired based on the real-time three-dimensional face image. On the basis of the three-dimensional face vertex data, the coordinates $V_{root}$ of root nodes of the virtual eyelashes can be acquired in real time, that is to say, the coordinates of root nodes of the virtual eyelashes in the current frame can be obtained as $V_{root}$, that is, the target positions of the first type of position vertexes in the present disclosure.

For example, based on key point coordinates of upper eyelid margin in the three-dimensional face vertex data, the coordinates of root nodes of the virtual eyelashes $V_{root}$ can determined. When the user blinks, the key point coordinates of the upper eyelid margin will move, and the coordinates $V_{root}$ of root nodes of the virtual eyelashes in the current frame will change along with the change of the key point coordinates of the upper eyelid margin. Therefore, based on the collected key point coordinates of the upper eyelid margin of the current frame, the coordinates $V_{root}$ of root nodes of the virtual eyelashes can be acquired in real time, so that the roots of the virtual eyelashes can fit the upper eyelid.

S103. on the basis of a posture change of a target object corresponding to the virtual prop, attribute information of the virtual prop, and a morphological parameter of the virtual prop in an initial frame, determining target positions of a second type of position vertexes of the virtual prop.

Figure 2:
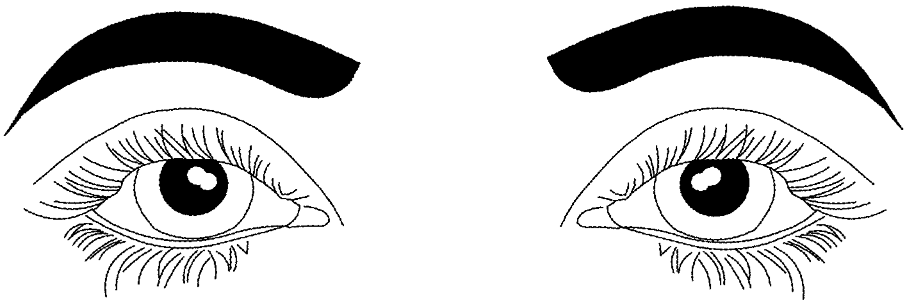
FIG. 2 is a schematic diagram of an eye posture provided by the present disclosure.

When the user blinks, the postures of eyes change. Depending on the user's blink degree, the eyes will also show different postures. Therefore, the blink degree can be used to reflect the change in the postures of the eyes, and the blink degree can be quantified by, for example, the blink coefficient B. FIG. 2 is a schematic diagram of an eye posture provided by the present disclosure, FIG. 3 is a schematic diagram of another eye posture provided by the present disclosure, FIG. 4 is a schematic diagram of yet another eye posture provided by the present disclosure, when the eyes are fully open, the blink coefficient B=1, and at this time, the postures of the eyes are as shown in FIG. 2; when the eyes are half-open, the blink coefficient B=0.5, at this time, the postures of the eyes are as shown in FIG. 3; when the user closes his eyes, the blink coefficient B=0, at this time, the postures of the eyes are as shown in FIG. 4.

Figure 3:
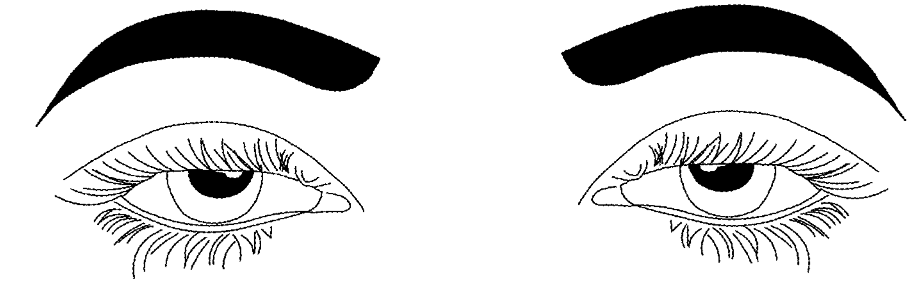
FIG. 3 is a schematic diagram of another eye posture provided by the present disclosure.
Figure 4:
FIG. 4 is a schematic diagram of yet another eye posture provided by the present disclosure.

It should be noted that FIGS. 2 to 4 only illustrate three postures of eyes, and in practical applications, the eyes can also be in other postures, which are not specifically limited in this embodiment.

To sum up, different blink coefficients correspond to different eye postures.

The attribute information of the virtual prop may include flip sensitivity S, maximum flip angle $D_{max}$ of the virtual eyelashes, length L and curl degree C. of the virtual eyelashes, etc. The morphological parameters of the initial frame may include offsets $\overrightarrow{Delta_0}$ between the root node coordinates $V_{root0}$ and the tip node coordinates $V_{tip0}$ of the virtual eyelashes in the initial frame, where $\overrightarrow{Delta_0}=V_{tip0}-V_{root0}$. On the basis of the blink coefficient B and offsets $\overrightarrow{Delta_0}$ between the root nodes and the tip nodes of the virtual eyelashes in the initial frame, and the flip sensitivity S, maximum flip angle $D_{max}$ of the virtual eyelashes, length L and curl degree C. of the virtual eyelashes, etc., it can be determined the coordinates $V_{tip}$ of tip nodes of the virtual eyelashes in the current frame, that is, the target positions of the second type of position vertexes.

S105: on the basis of the target positions of the first type of position vertexes, the target positions of the second type of position vertexes, and position information of the vertexes of the virtual prop in a historical frame, acquiring target positions of the vertexes of the virtual prop in the current frame.

In some embodiments, the historical frame may include various appropriate frames, particularly an initial frame, a previous frame, etc., and the position information of vertexes of the virtual prop in the historical frame may include the position information of vertexes in the initial mesh, and the position information of vertexes in the previous frame mesh, etc.

Figure 5:
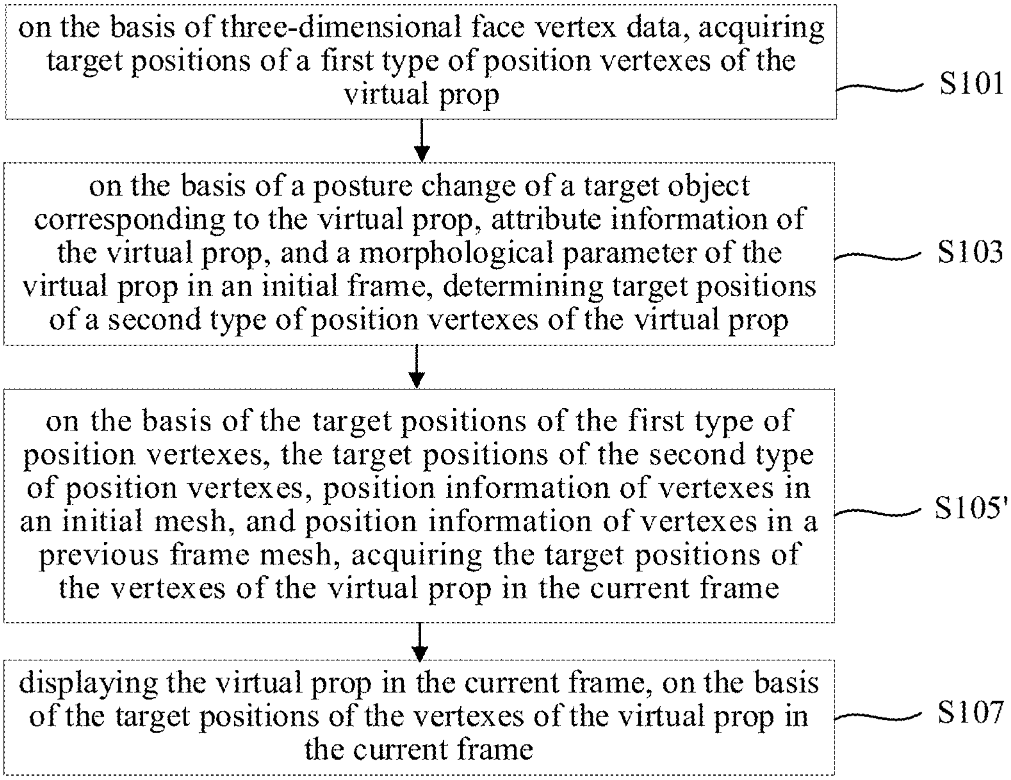
FIG. 5 is a schematic flowchart of another method of processing a virtual prop provided by the present disclosure.

As a specific description of a possible implementation when executing S105, as shown in FIG. 5:

S105', on the basis of the target positions of the first type of position vertexes, the target positions of the second type of position vertexes, position information of vertexes in an initial mesh, and position information of vertexes in a previous frame mesh, acquiring the target positions of the vertexes of the virtual prop in the current frame.

Among them, the initial mesh is a mesh composed of vertexes of the virtual prop in an initial frame, and the previous frame mesh is a mesh composed of vertexes in the virtual prop in the previous frame.

The morphology of virtual eyelashes can be determined by positions of respective vertexes of virtual eyelashes. The vertexes of virtual eyelashes include tip nodes, root nodes, and other vertexes between tip nodes and root nodes, the vertexes of virtual eyelashes constitute a mesh, then the position information of the vertexes in the mesh determines the morphology of the virtual eyelashes. Different meshes correspond to different morphologies of virtual eyelashes, the virtual eyelashes in the previous frame correspond to the previous frame mesh, in the virtual eyelashes in the previous frame mesh, the tip node coordinates are $V_{tip1}$, and the root node coordinates are $V_{root1}$, in accordance with the tip node coordinates $V_{tip1}$, root node coordinates $V_{root1}$, and coordinates of other vertexes i $V_{i1}$ in the previous frame mesh, the virtual eyelashes in the previous mesh can be presented. The virtual eyelashes in the initial frame correspond to the initial mesh, in the virtual eyelashes in the initial mesh, the tip node coordinates are $V_{tip0}$, and the root node coordinates are $V_{root0}$, in accordance with the tip node coordinates $V_{tip0}$, root node coordinates $V_{root0}$, and coordinates of other vertexes i $V_{i0}$ in the initial mesh, the virtual eyelashes in the initial mesh can be presented.

Based on the above embodiments, the tip node coordinates $V_{tip}$ and the root node coordinates $V_{root}$ in the virtual eyelashes in the initial mesh can be acquired, and based on the previous frame mesh and the initial mesh, coordinates of other nodes in the current mesh can be obtained, that is, the tip node coordinates $V_{tip}$, root node coordinates $V_{root}$, and coordinates of other vertexes $V_i$ in the present frame can be acquired. The previous frame mesh can be deformed based on the previous frame mesh, so that the tip node coordinates can move from $V_{tip1}$ to $V_{tip}$, the root node coordinates move from $V_{root1}$ to $V_{root}$, and the other vertex coordinates move from $V_{i1}$ to $V_i$, and the current frame mesh can be acquired.

S107: displaying the virtual prop in the current frame, on the basis of the target positions of the vertexes of the virtual prop in the current frame.

On the basis of the tip node coordinates $V_{tip}$ and root node coordinates $V_{root}$ of the virtual eyelashes in the current frame mesh, and coordinates of other vertexes $V_i$ in the present frame mesh, the virtual eyelashes corresponding to the current frame mesh are displayed in the current frame.

Figure 6:
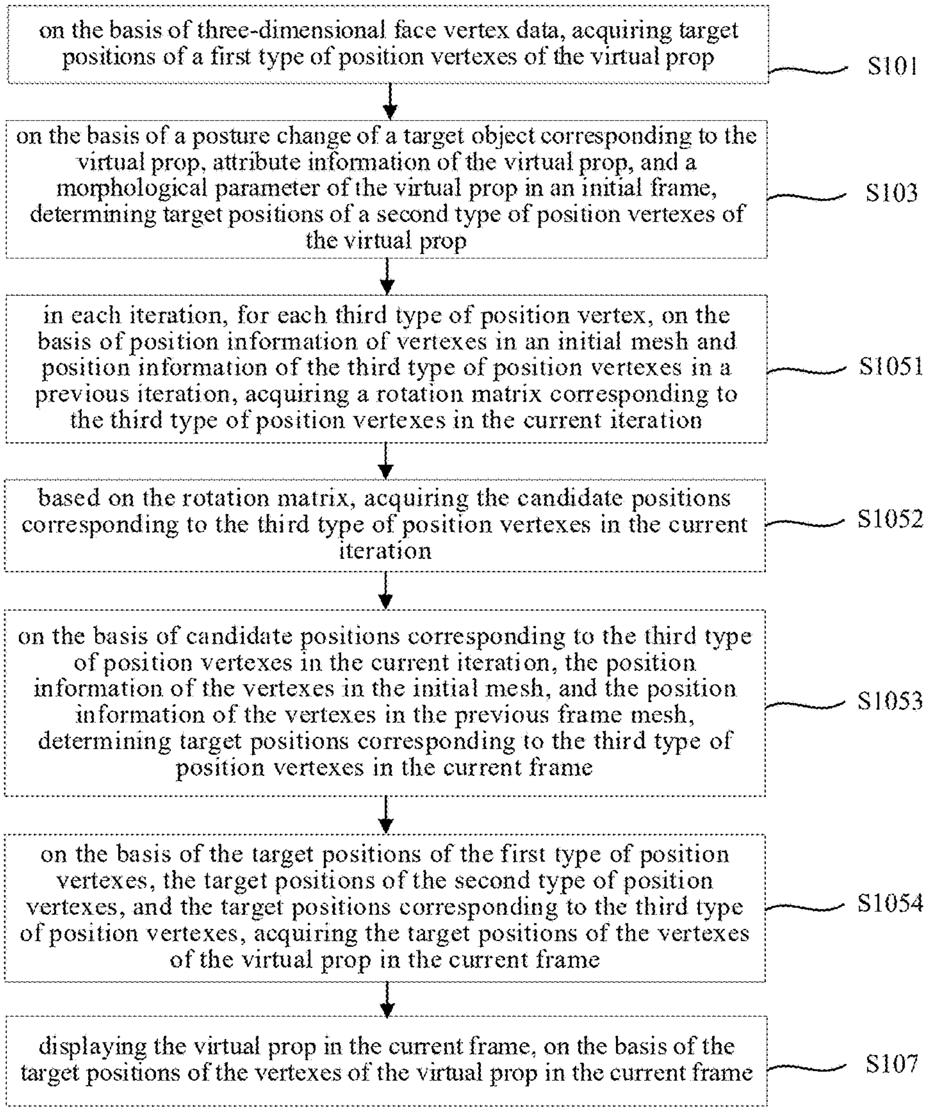
FIG. 6 is a schematic flowchart of yet another method of processing a virtual prop provided by the present disclosure.

FIG. 6 is a schematic flowchart of yet another method of processing a virtual prop provided by the present disclosure. FIG. 6 is a detailed description of a possible implementation when performing S105' based on the embodiment as shown in FIG. 5, as follows:

S1051, in each iteration, for each third type of position vertex, on the basis of position information of vertexes in an initial mesh and position information of the third type of position vertexes in a previous iteration, acquiring a rotation matrix corresponding to the third type of position vertexes in the current iteration.

Among them, initial values of position information of the third type of position vertexes in the previous iteration are position information of the third type of position vertexes in the previous frame mesh.

Figure 7:
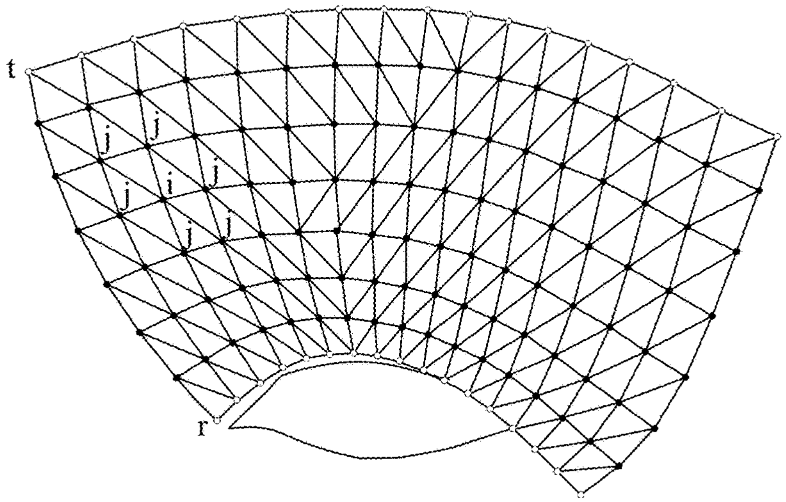
FIG. 7 is a schematic diagram of third type of position vertexes provided by the present disclosure.

FIG. 7 is a schematic diagram of the third type of position vertexes provided by the present disclosure, as shown in FIG. 7, each virtual eyelash includes a root node r and a tip node t, there are multiple intermediate nodes i between the root node r and a tip node t, and these intermediate nodes i are the third type of position vertexes.

For example, the position information of the third type of position vertexes can be the intermediate node coordinates, for each third type of position vertex, on the basis of the root node coordinate $V_{root0}$, the tip node coordinate $V_{tip0}$, and the coordinate $V_{i0}$ of intermediate node i in the initial mesh, and the intermediate node coordinate $V_{i1}$ of the virtual eyelash in the previous frame mesh, by taking the intermediate node coordinates $V_{i1}$ of the virtual eyelashes as the initial value for the first iteration of the current frame, a rotation matrix $R_i$ corresponding to the intermediate node i in the first iteration of the current frame can be acquired. In turn, based on the intermediate node coordinates $V_{i1}$ of the virtual eyelash after n iterations of the current frame, a rotation matrix $R_i$ corresponding to the intermediate node i in the n+1th iteration of the current frame can be acquired.

S1052: based on the rotation matrix, acquiring the candidate positions corresponding to the third type of position vertexes in the current iteration.

According to the coordinates of the intermediate node i in the previous iteration and the rotation matrix Ri corresponding to the intermediate node i in the current iteration, the coordinates of the intermediate node i after the current iteration can be determined, that is, the candidate position corresponding to the intermediate node i can be determined.

S1053: on the basis of candidate positions corresponding to the third type of position vertexes in the current iteration, the position information of the vertexes in the initial mesh, and the position information of the vertexes in the previous frame mesh, determining target positions corresponding to the third type of position vertexes in the current frame.

A total deformation energy of mesh in the current iteration can be acquired, based on the candidate positions corresponding to all or part of intermediate nodes i in the current iteration and the root node coordinates $V_{root0}$, tip node coordinates $V_{tip0}$ and intermediate node coordinates $V_{i0}$ of the virtual eyelashes in the initial mesh, and a corresponding candidate position when the total deformation energy meets a preset condition can be the coordinates of the intermediate node i. A corresponding candidate position when the number of iterations meets a preset number can also be the coordinates of the intermediate node i.

S1054: on the basis of the target positions of the first type of position vertexes, the target positions of the second type of position vertexes, and the target positions corresponding to the third type of position vertexes, acquiring the target positions of the vertexes of the virtual prop in the current frame.

The root node coordinates $V_{root}$ of the virtual eyelashes and the tip node coordinates $V_{tip}$ of the virtual eyelashes in the current frame decide the root positions and tip positions of the virtual eyelashes in the current frame. As shown in FIG. 7, in the virtual eyelashes in the current frame, the intermediate node i is located between the root node r and the tip node t, that is to say, each virtual eyelash starts from the root node r and extends to the tip node t through multiple intermediate nodes i successively, so the intermediate node coordinates $V_i$ determine the specific morphology of the virtual eyelashes. Based on the root node coordinates $V_{root}$, tip node coordinates $V_{tip}$ and intermediate node coordinates $V_i$ of the virtual eyelashes in the current frame, different morphologies of virtual eyelashes can be presented.

In this embodiment, by, in each iteration, for each third type of position vertex, on the basis of position information of vertexes in an initial mesh and position information of the third type of position vertexes in a previous iteration, acquiring a rotation matrix corresponding to third type of position vertexes in the current iteration, wherein initial values of position information of the third type of position vertexes in the previous iteration are position information of the third type of position vertexes in the previous frame mesh; on the basis of candidate positions corresponding to the third type of position vertexes in the current iteration, the position information of the vertexes in the initial mesh, and the position information of the vertexes in the previous frame mesh, determining target positions corresponding to the third type of position vertexes in the current frame; on the basis of the target positions of the first type of position vertexes, the target positions of the second type of position vertexes, and the target positions corresponding to the third type of position vertexes, acquiring the target positions of the vertexes of the virtual prop in the current frame, the target positions of the third type of position vertexes in the current frame decide the specific morphology of the virtual eyelashes in the current frame, thereby, different morphologies of virtual eyelashes can be presented based on the target positions corresponding to the third type of position vertexes, and morphology diversity of virtual eyelashes can be improved.

Figure 8:
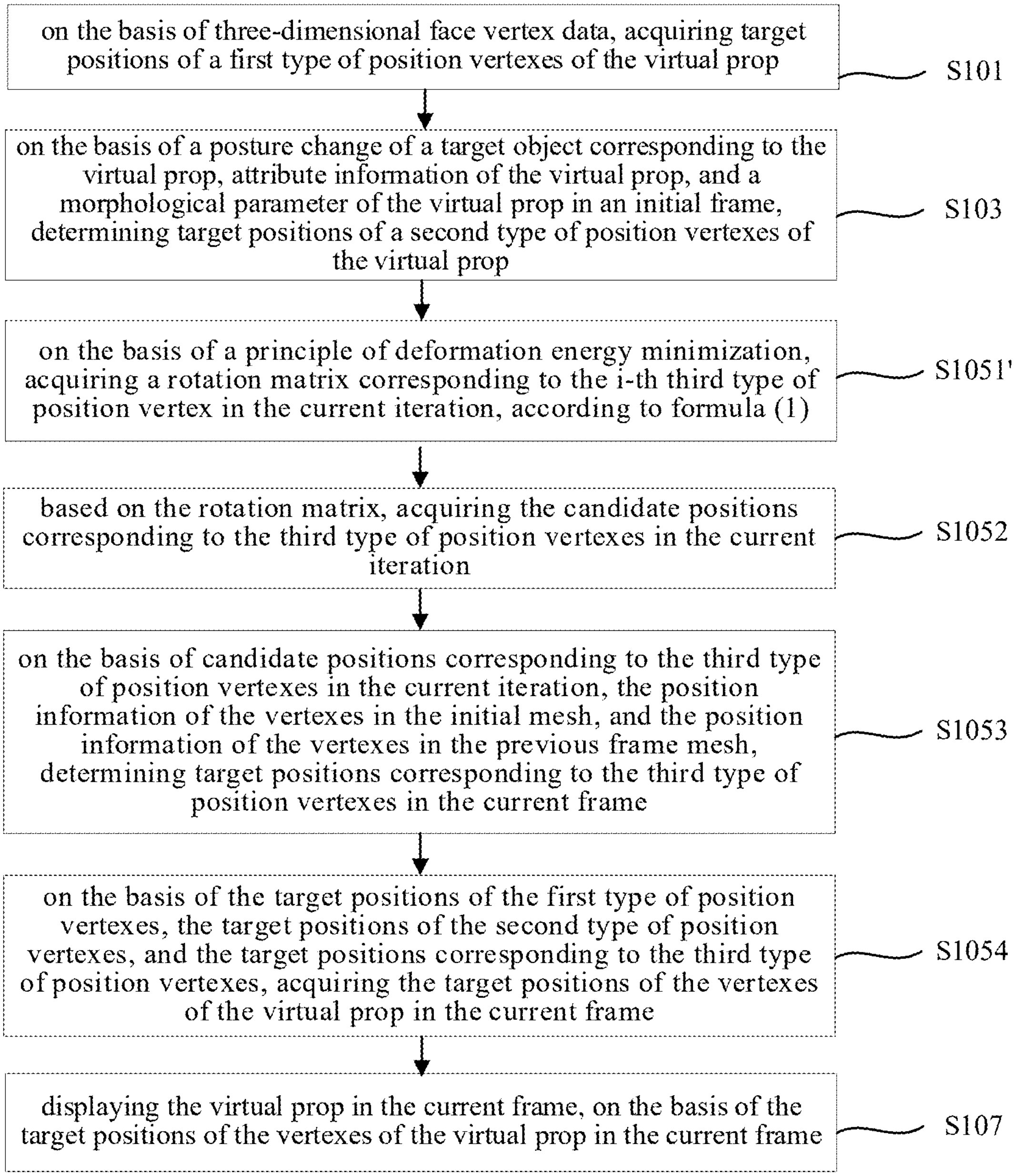
FIG. 8 is a schematic flowchart of yet another method of processing a virtual prop provided by the present disclosure.

FIG. 8 is a schematic flowchart of another method of processing a virtual prop provided by the present disclosure. FIG. 8 is a detailed description of a possible implementation of S1051 on the basis of the embodiment as shown in FIG. 6, as follows:

S1051', on the basis of a principle of deformation energy minimization, acquiring a rotation matrix corresponding to the i-th third type of position vertex in the current iteration, according to formula (1):

$$E=\Sigma_{j\in N(i)}\omega_{ij}\|(p'_i-p'_j)-R_i(p_i-p_j)\|^2 \quad (1)$$

Among them, j∈N(i) means that a third type of position vertex i is a point adjacent to a third type of position vertex j, $\omega_{ij}$ represents a weight value for an edge formed by the third type of position vertex i and the third type of position vertex j, $p_i$ represents the position of the third type of position vertex i in the initial mesh, $p_j$ represents the position of the third type of position vertex j in the initial mesh, $p'_i$ represents the position of the third type of position vertex i in the mesh in the previous iteration, $p'_j$ represents the position of the third type of position vertex j in the mesh in the previous iteration, $R_i$ is the rotation matrix corresponding to the third type of position vertex i in the current iteration.

For example, as shown in FIG. 7, there are 6 intermediate nodes j around and adjacent to the intermediate node i, the rotation matrix $R_i$ of the intermediate node i in the current iteration can be determined according to the minimum value of formula (1). For example, by deriving formula (1) to obtain the minimum value of formula (1), formula (3) and formula (4) can be obtained:

$$S_i=\Sigma_{j\in N(i)}\omega_{ij}e_{ij}e'^T_{ij} \quad (3)$$

Among them, $e_{ij}$ represents the edge formed by vertex i and vertex j of the initial mesh, that is, $e_{ij}=p_i-p_j$, and $e'_{ij}$ represents the edge formed by vertex i and vertex j in the previous iteration, that is, $e'_{ij}=p'_i-p'_k$.

$$R_i=V_iU_i^T \quad (4)$$

Among them, $V_i$ and $U_i$ are two unitary matrices obtained by singular value decomposition of matrix $S_i$.

Figure 9:
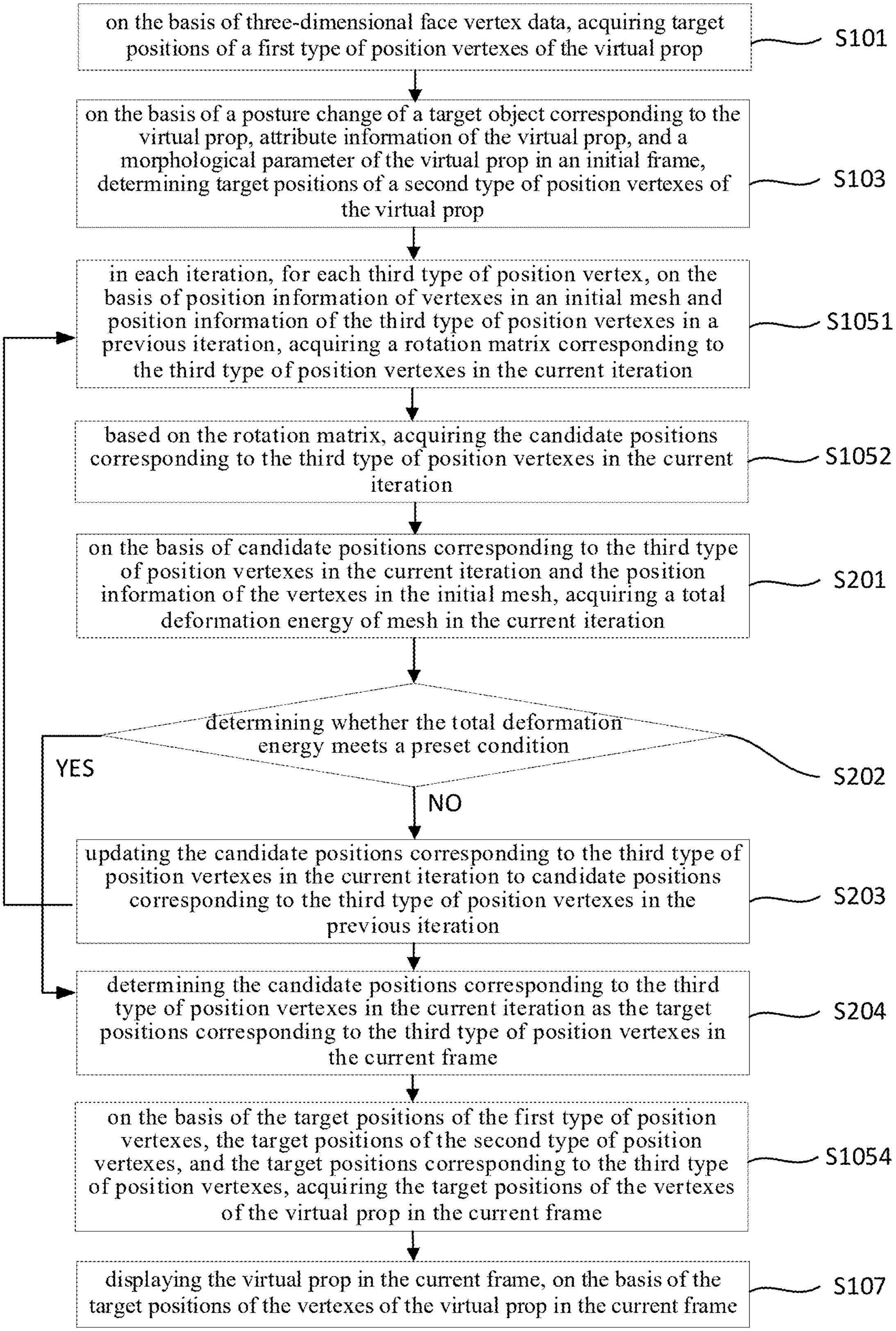
FIG. 9 is a schematic flowchart of yet another method of processing a virtual prop provided by the present disclosure.

FIG. 9 is a schematic flowchart of another method of processing a virtual prop provided by the present disclosure, FIG. 9 is a detailed description of a possible implementation of S1053 on the basis of the embodiment as shown in FIG. 6, as follows:

S201, on the basis of candidate positions corresponding to the third type of position vertexes in the current iteration and the position information of the vertexes in the initial mesh, acquiring a total deformation energy of mesh in the current iteration.

Among them, the total deformation energy is used to characterize a degree of deformation of the mesh.

Figure 10:
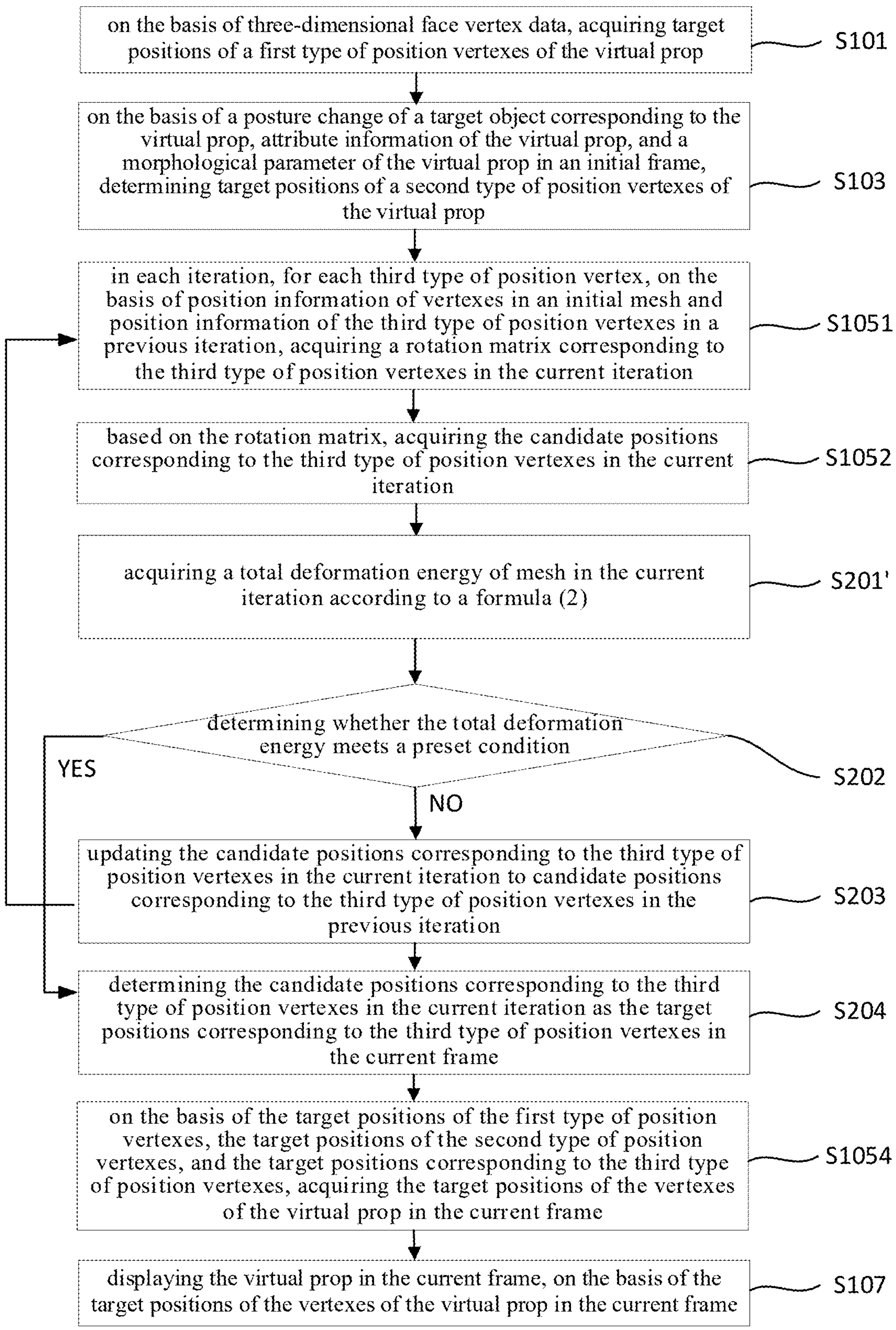
FIG. 10 is a schematic flowchart of yet another method of processing a virtual prop provided by the present disclosure.

As a specific description of a possible implementation of S201, as shown in FIG. 10:

S201' acquires the total deformation energy of mesh in the current iteration according to formula (2):

$$E=\Sigma_{i=1}^{n}\omega_i\Sigma_{j\in N(i)}\omega_{ij}\|(p'_i-p'_j)-R_i(p_i-p_i)\|^2 \quad (2)$$

Among them, j∈N(i) means that a third type of position vertex i is a point adjacent to a third type of position vertex j, $\omega_{ij}$ represents a weight value for an edge formed by the third type of position vertex i and the third type of position vertex j, $p_i$ represents the position of the third type of position vertex i in the initial mesh, $p_j$ represents the position of the third type of position vertex j in the initial mesh, $p'_i$ represents the position of the third type of position vertex i in the mesh in the previous iteration, $p'_j$ represents the position of the third type of position vertex j in the mesh in the previous iteration, $R_i$ is the rotation matrix corresponding to the third type of position vertex i in the current iteration.

Formula (5) can be obtained by derivation of both sides of formula (2):

$$\Sigma_{j\in N(i)}\omega_{ij}(p'_i-p'_j)=\Sigma_{j\in N(i)}\frac{\omega_{ij}}{2}(R_i+R_j)(p_i-p_j) \quad (5)$$

Among them, $R_j$ is the rotation matrix corresponding to the third type of position vertex j in the current iteration.

The solution of formula (5) can be regarded as a problem of solving a system of sparse non-homogeneous linear equations. By solving formula (5), the candidate position of the intermediate node i of the virtual eyelash in the current iteration can be obtained. By substituting the solved candidate position of the intermediate node i into formula (2), it can be obtained the minimum value of the total deformation energy, that is, the total deformation energy of mesh in the current iteration.

S202: determining whether the total deformation energy meets a preset condition.

If not, proceeds to S203; if yes, proceeds to S204.

Based on the above embodiments, the preset condition may be that greater than or equal to a preset energy. If the total deformation energy of mesh in the current iteration is greater than or equal to the preset energy, then the total deformation energy can meet the preset condition; if the total deformation energy of mesh in the current iteration is less than the preset energy, the total deformation energy does not meet the preset condition.

If the total deformation energy of mesh in the current iteration does not meet the preset condition, the total deformation energy corresponding to the candidate position of the intermediate node i determined in the current iteration is larger, a smaller total deformation energy needs to be found. Since the total deformation energy gradually decreases as the iteration progresses, the iteration needs to continue until the total deformation energy is less than the preset energy.

S203: updating the candidate positions corresponding to the third type of position vertexes in the current iteration to candidate positions corresponding to the third type of position vertexes in the previous iteration, and returning to execution of S1051.

If the total deformation energy of mesh in the current iteration does not meet the preset condition, for example, the candidate position corresponding to the intermediate node i in the current iteration is $p''_i$, and by substituting the candidate position corresponding to the intermediate node i in the current iteration $p''_i$ into formula (1) as $p'_i$, the candidate position $p''_i$ corresponding to the intermediate node i in the next iteration can be obtained. As the number of iterations increases, the total deformation energy of the mesh gradually decreases, until it is less than the preset energy, thus satisfying the preset condition.

S204: determining the candidate positions corresponding to the third type of position vertexes in the current iteration as the target positions corresponding to the third type of position vertexes in the current frame.

If the total deformation energy of mesh in the current iteration meets the preset condition, the solution corresponding to the total deformation energy of mesh in the current iteration is the target position corresponding to the intermediate node i in the current frame.

Figure 11:
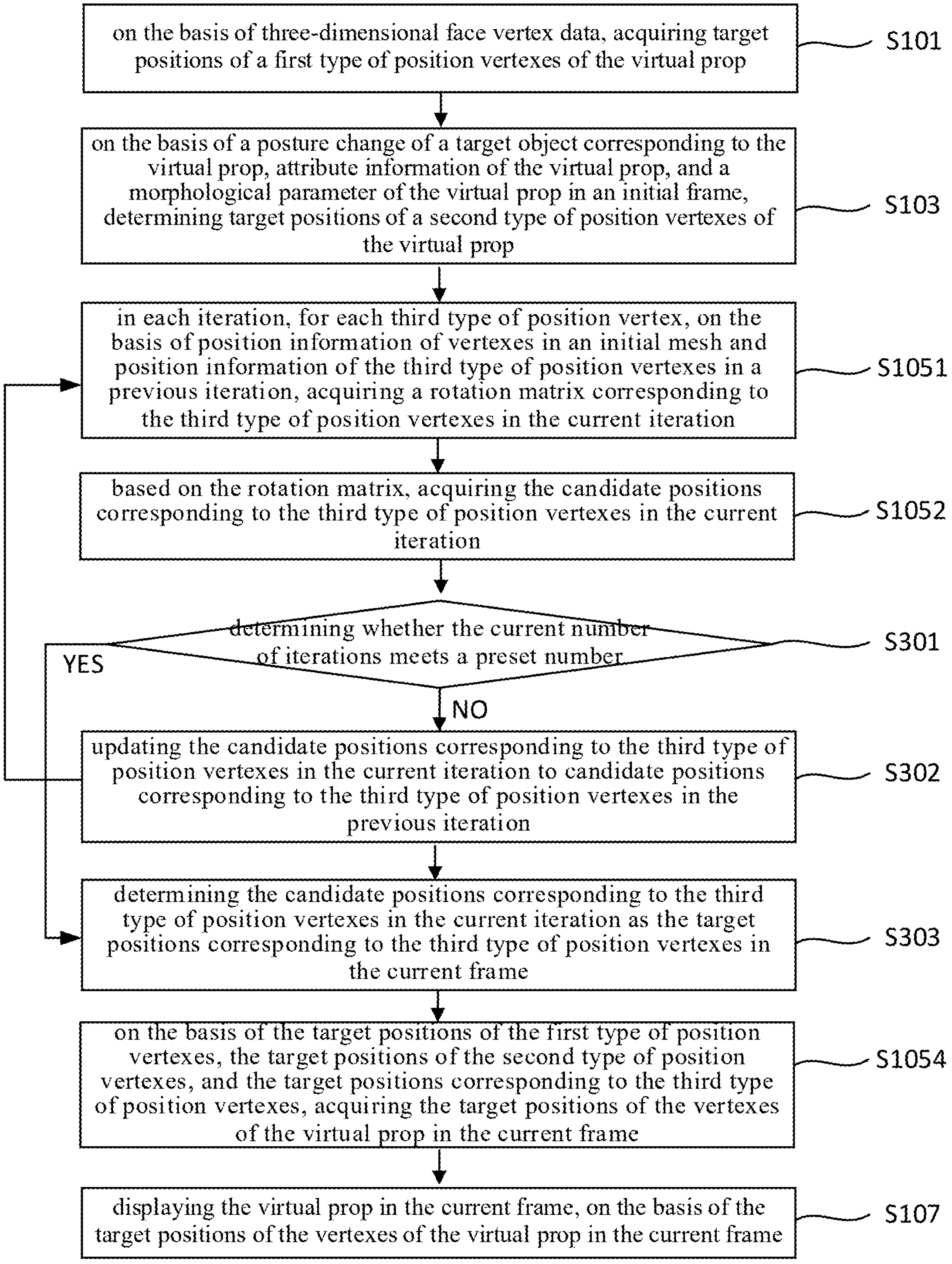
FIG. 11 is a schematic flowchart of yet another method of processing a virtual prop provided by the present disclosure.

FIG. 11 is a schematic flowchart of yet another method of processing a virtual prop provided by the present disclosure. FIG. 11 is a detailed description of another possible implementation when performing S1053, on the basis of the embodiment as shown in FIG. 6, as follows:

S301. determining whether the current number of iterations meets a preset number.

If not, proceeds to S302; if yes, proceeds to S303.

The preset condition may be equal to the preset number. If the current iteration number is less than the preset number, the current iteration number does not meet the preset number; if the current iteration number is equal to the preset number, then the current iteration number meets the preset number.

If the current number of iterations does not meet the preset number, it is considered that the current number of iterations is relatively small, the total deformation energy corresponding to the candidate position of the intermediate node i determined in the current iteration is larger, and a smaller total deformation energy needs to be found. Since as the number of iterations increases, the total deformation energy of mesh in the current iteration gradually decreases, the iteration needs to continue to obtain a smaller total deformation energy, until the current number of iterations meets the preset number.

S302: updating the candidate positions corresponding to the third type of position vertexes in the current iteration to candidate positions corresponding to the third type of position vertexes in the previous iteration, and returning to execution of S1051.

If the current number of iterations does not meet the preset number, for example, the current iteration number is 81th, the preset number is 100, the current number of iterations is less than the preset number, and the preset condition is not met, the candidate position $p''_i$ corresponding to the intermediate node i in the 81th iteration will be substituted into the formula (1) as $p'_i$ to be substituted into the formula (1), and the candidate position $p''_i$ corresponding to the intermediate node i in the 82th iteration can be obtained. As the number of iterations increases, the current number of iterations becomes closer and closer to the preset number, until the current number of iterations is equal to 100, thereby meeting the preset number.

S303: determining the candidate positions corresponding to the third type of position vertexes in the current iteration as the target positions corresponding to the third type of position vertexes in the current frame.

If the current number of iterations meets the preset number, the solution corresponding to the total deformation energy of mesh in the current iteration is the target position corresponding to the middle node i in the current frame.

Figure 12:
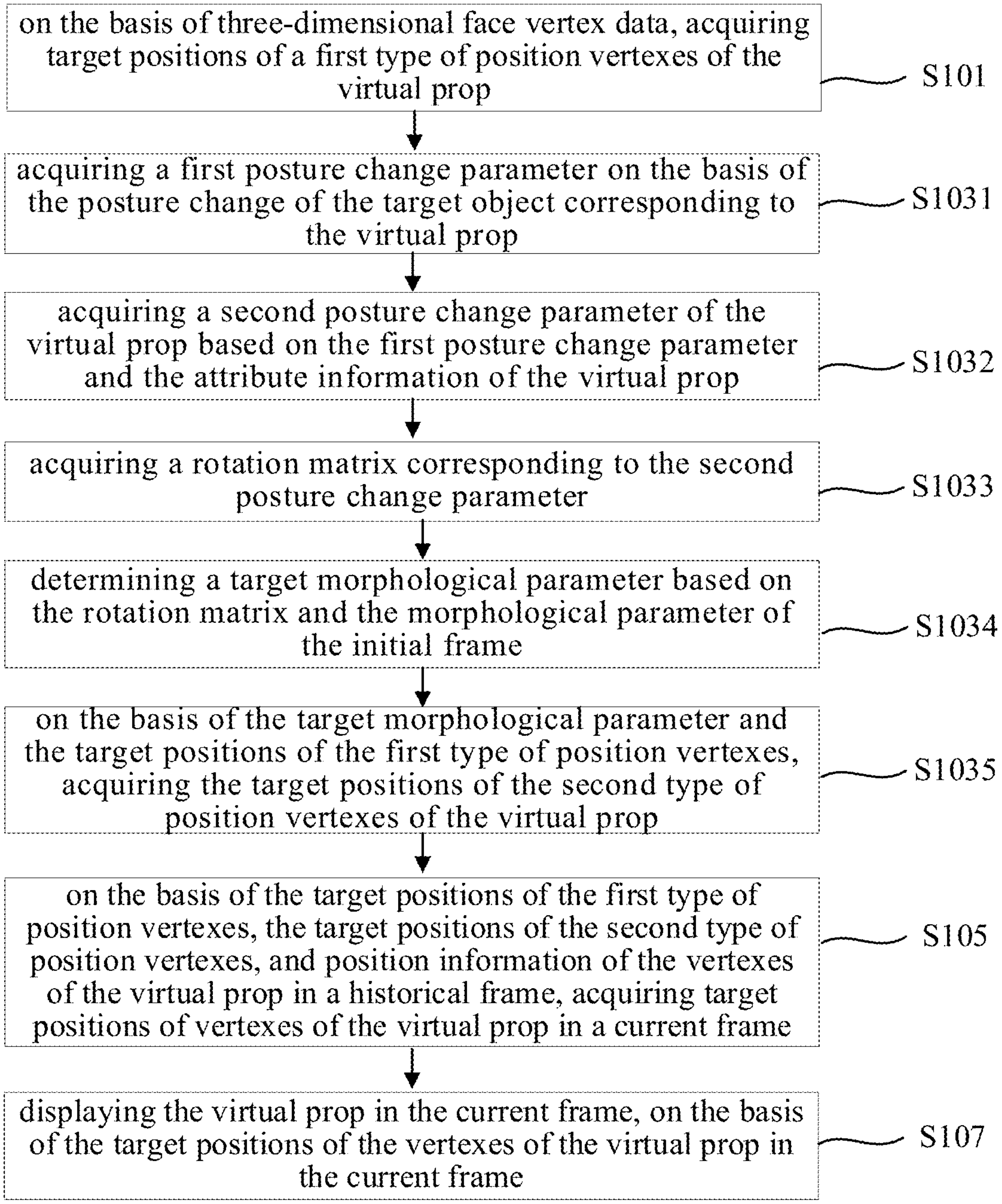
FIG. 12 is a schematic flowchart of yet another method of processing a virtual prop provided by the present disclosure.

FIG. 12 is a schematic flowchart of yet another method of processing a virtual prop provided by the present disclosure. FIG. 12 is a detailed description of a possible implementation when performing S103, on the basis of the embodiment as shown in FIG. 1, as follows:

S1031. acquiring a first posture change parameter on the basis of the posture change of the target object corresponding to the virtual prop.

On the basis of the above embodiments, the first posture change parameter may be a blink coefficient B in the current frame. For example, the blink coefficient B may be determined based on difference between key point coordinates $V_{up}$ of the upper eyelid and key point coordinate $V_{down}$ of the lower eyelid in the user's three-dimensional face vertex data.

S1032: acquiring a second posture change parameter of the virtual prop based on the first posture change parameter and the attribute information of the virtual prop.

For example, the attribute information of the virtual prop may include a maximum flip angle $D_{max}$ of the virtual eyelashes, and the second posture change parameter may be the flip angle D of the virtual eyelashes in the current frame which can be acquired based on the product of the maximum flip angle $D_{max}$ and the blink coefficient B.

For example, according to formula (6), the flip angle D of the virtual eyelashes in the current frame can be determined:

$$D = D_{max} \times B \tag{6}$$

S1033. acquiring a rotation matrix corresponding to the second posture change parameter.

Based on the flip angle D of the virtual eyelashes in the current frame, a corresponding rotation matrix R (D) can be obtained according to formula (7):

$$R(D) = \begin{bmatrix} 1 & 0 & 0 & 0 \\ 0 & \cos(D_x) & -\sin(D_x) & 0 \\ 0 & \sin(D_x) & \cos(D_x) & 0 \\ 0 & 0 & 0 & 1 \end{bmatrix} * \begin{bmatrix} \cos(D_y) & 0 & \sin(D_y) & 0 \\ 0 & 1 & \cos(D_y) & 0 \\ -\sin(D_y) & 0 & 0 & 1 \\ 0 & 0 & 0 & 1 \end{bmatrix} * \begin{bmatrix} \cos(D_z) & -\sin(D_z) & 0 & 0 \\ \sin(D_z) & \cos(D_z) & 0 & 0 \\ 0 & 0 & 1 & 0 \\ 0 & 0 & 0 & 1 \end{bmatrix} \tag{7}$$

Among them, $D_x$ is the component of the flip angle D of the virtual eyelashes in the x direction, $D_y$ is the component of the flip angle D of the virtual eyelashes in the y direction, and $D_z$ is the component of the flip angle D of the virtual eyelashes in the z direction.

S1034: determining a target morphological parameter based on the rotation matrix and the morphological parameter of the initial frame.

Based on the rotation matrix R (D) corresponding to the flip angle D of the virtual eyelashes and offsets $\overrightarrow{Delta_0}$ between the root node coordinates $V_{root0}$ and the tip node coordinates $V_{tip0}$ of the virtual eyelashes in the initial frame, offsets $\overrightarrow{Delta}$ between the root node coordinates and the tip node coordinates of the virtual eyelashes in the current frame can be determined according to formula (8):

$$\overrightarrow{Delta} = R(D) * \overrightarrow{Delta_0} \tag{8}$$

S1035: on the basis of the target morphological parameter and the target positions of the first type of position vertexes, acquiring the target positions of the second type of position vertexes of the virtual prop.

For example, based on the offsets $\overrightarrow{\text{Delta}}$ between the root node coordinates and the tip node coordinates of the virtual eyelashes in the current frame and the root node coordinates $V_{root}$ of the virtual eyelashes in the current frame, the tip node coordinates $V_{tip}$ of virtual eyelashes in the current frame can be determined according to formula (9):

$$V_{tip} = V_{root} + \overrightarrow{\text{Delta}} \tag{9}$$

It can be seen that based on the flip angle of the virtual eyelashes and the offset between the root node and tip node of the virtual eyelashes in the initial frame, the offset between the root node and tip node of the virtual eyelashes in the current frame can be obtained, so that the target position of the tip node of the virtual eyelashes in the current frame can be determined.

In this embodiment, by acquiring a first posture change parameter on the basis of the posture change of the target object corresponding to the virtual prop; acquiring a second posture change parameter of the virtual prop based on the first posture change parameter and the attribute information of the virtual prop; acquiring a rotation matrix corresponding to the second posture change parameter; obtaining a target morphological parameter based on the rotation matrix and the morphological parameter of the initial frame; on the basis of the target morphological parameter and the target positions of the first type of position vertexes, acquiring the target positions of the second type of position vertexes of the virtual prop, it is possible to acquire the target positions of the second type of position vertexes based on the positions of vertexes in the initial mesh and the morphology of the object in the current frame, so as to obtain the target positions of vertexes of virtual prop in the current frame, display the virtual prop corresponding to the target positions of vertexes of virtual prop in the current frame, so that the virtual prop can better fit the target object in different postures and improve the display effects of the virtual prop.

Figure 13:
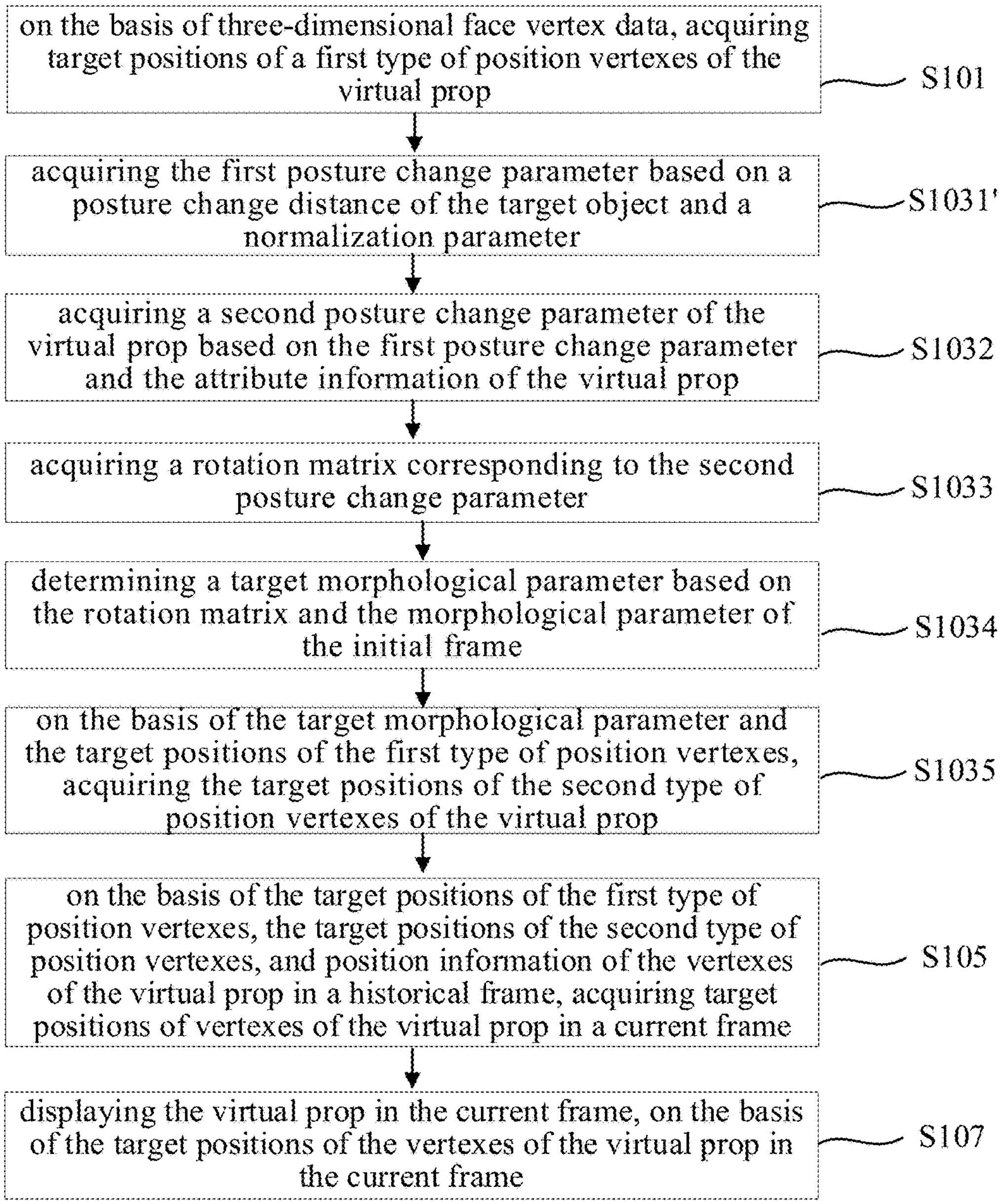
FIG. 13 is a schematic flowchart of yet another method of processing a virtual prop provided by the present disclosure.

FIG. 13 is a schematic flowchart of another method of processing a virtual prop provided by the present disclosure. FIG. 13 is a detailed description of a possible implementation when performing S1031, on the basis of the embodiment as shown in FIG. 12, as follows:

S1031', acquiring the first posture change parameter based on a posture change distance of the target object and a normalization parameter.

For example, the blink coefficient B can be determined according to formula (10):

$$B = \min\left(\frac{|V_{up} - V_{down}|}{S}, 1.0\right) \tag{10}$$

Among them, $V_{up}$ represents key point coordinates of the upper eyelid, $V_{down}$ represents key point coordinates of the lower eyelid, and S is the normalization parameter.

The normalization parameter S is a preset parameter. The smaller value between $|V_{up}-V_{down}|/S$ and 1 is the blink coefficient B, generally, the larger the eyes are, the larger the value of the normalization parameter S is, so that in a state that the eyes are incompletely open, the blink coefficient B should be less than 1 as much as possible to ensure that the value of the blink coefficient B is relatively close to the real eye posture, in this way, the value of the blink coefficient B ranges from 0 to 1, which can achieve the purpose of normalizing the blink coefficient, it can determine more accurate blink coefficients for eyes of different sizes, thereby making the virtual prop to better fit the target object and improving the display effect of the virtual prop.

Based on the above embodiments, optionally, the virtual prop is virtual eyelashes, and the target object is the eyes correspondingly. Through the above solution, it is possible to enable the virtual eyelashes to better fit the eyes, and improve the fitness between the virtual eyelashes and the eyes, thereby improving the display effect of the virtual eyelashes.

Figure 14:
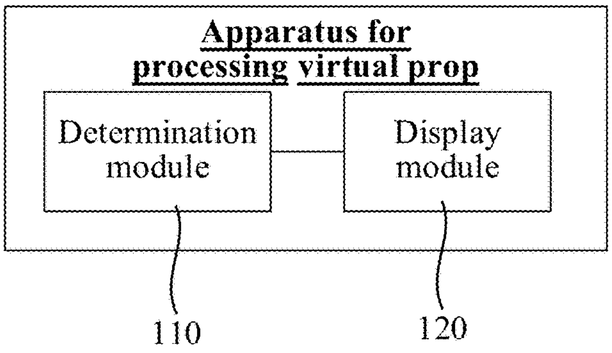
FIG. 14 is an apparatus for processing a virtual prop provided by the present disclosure.

The present disclosure also provides a virtual prop processing apparatus. FIG. 14 is a schematic structural diagram of a virtual prop processing apparatus provided by the present disclosure. As shown in FIG. 14, the virtual prop processing apparatus 100 includes:

- a determination module 110, configured to, on the basis of three-dimensional face vertex data, acquire target positions of a first type of position vertexes of the virtual prop; on the basis of a posture change of a target object corresponding to the virtual prop, attribute information of the virtual prop, and a morphological parameter of the virtual prop in an initial frame, determine target positions of a second type of position vertexes of the virtual prop; on the basis of the target positions of the first type of position vertexes, the target positions of the second type of position vertexes, and position information of the vertexes of the virtual prop in a historical frame, acquire target positions of the vertexes of the virtual prop in a current frame.
- a displaying module 120, configured to display the virtual prop in the current frame, on the basis of the target positions of the vertexes of the virtual prop in the current frame.

Optionally, the determination module 110 is further configured to, on the basis of the target positions of the first type of position vertexes, the target positions of the second type of position vertexes, position information of vertexes in an initial mesh, and position information of vertexes in a previous frame mesh, acquire the target positions of the vertexes of the virtual prop in the current frame, wherein the initial mesh is a mesh composed of vertexes of the virtual prop in an initial frame, and the previous frame mesh is a mesh composed of vertexes in the virtual prop in a previous frame.

Optionally, the determination module 110 is further configured to, in each iteration, for each third type of position vertex, on the basis of position information of vertexes in an initial mesh and position information of the third type of position vertexes in a previous iteration, acquire a rotation matrix corresponding to third type of position vertexes in the current iteration, and on the basis of the rotation matrix, acquire candidate positions corresponding to the third type of position vertexes in the current iteration, wherein initial values of position information of the third type of position vertexes in the previous iteration are position information of the third type of position vertexes in the previous frame mesh; on the basis of candidate positions corresponding to the third type of position vertexes in the current iteration, the position information of the vertexes in the initial mesh, and the position information of the vertexes in the previous frame mesh, determine target positions corresponding to the third type of position vertexes in the current frame; and on the basis of the target positions of the first type of position vertexes, the target positions of the second type of position vertexes, and the target positions corresponding to the third type of position vertexes, acquire the target positions of the vertexes of the virtual prop in the current frame.

Optionally, the determination module 110 is further configured to, on the basis of a principle of deformation energy minimization, acquire a rotation matrix corresponding to the i-th third type of position vertex in the current iteration, according to formula (1):

$$E=\Sigma_{j\in N(i)}\omega_{ij}\left\|(p'_i-p'_j)-R_i(p_i-p_j)\right\|^2 \quad (1)$$

Among them, $j\in N(i)$ means that a third type of position vertex i is a point adjacent to a third type of position vertex j, $\omega_{ij}$ represents a weight value for an edge formed by the third type of position vertex i and the third type of position vertex j, $p_i$ represents the position of the third type of position vertex i in the initial mesh, $p_j$ represents the position of the third type of position vertex j in the initial mesh, $p'_i$ represents the position of the third type of position vertex i in the mesh in the previous iteration, $p'_j$ represents the position of the third type of position vertex j in the mesh in the previous iteration, $R_i$ is the rotation matrix corresponding to the third type of position vertex i in the current iteration.

Optionally, the determination module 110 is further configured to, on the basis of candidate positions corresponding to the third type of position vertexes in the current iteration and the position information of the vertexes in the initial mesh, acquire a total deformation energy of mesh in the current iteration, where the total deformation energy is used to characterize a degree of deformation of the mesh; if the total deformation energy does not meet a preset condition, update the candidate positions corresponding to the third type of position vertexes in the current iteration to candidate positions corresponding to the third type of position vertexes in the previous iteration, and return to execution of acquiring a rotation matrix corresponding to third type of position vertexes in the current iteration on the basis of position information of vertexes in an initial mesh and position information of the third type of position vertexes in a previous iteration, until the total deformation energy of mesh in the current iteration meets the preset condition; and determine the candidate positions corresponding to the third type of position vertexes in the current iteration as the target positions corresponding to the third type of position vertexes in the current frame.

Optionally, the determination module 110 is further configured to acquire the total deformation energy of mesh in the current iteration according to formula (2):

$$E=\Sigma_{i=1}^{n}\omega_i\Sigma_{j\in N(i)}\omega_{ij}\left\|(p'_i-p'_j)-R_i(p_i-p_i)\right\|^2 \quad (2)$$

Among them, $j\in N(i)$ means that a third type of position vertex i is a point adjacent to a third type of position vertex j, $\omega_{ij}$ represents a weight value for an edge formed by the third type of position vertex i and the third type of position vertex j, $p_i$ represents the position of the third type of position vertex i in the initial mesh, $p_j$ represents the position of the third type of position vertex j in the initial mesh, $p'_i$ represents the position of the third type of position vertex i in the mesh in the previous iteration, $p'_j$ represents the position of the third type of position vertex j in the mesh in the previous iteration, $R_i$ is the rotation matrix corresponding to the third type of position vertex i in the current iteration.

Optionally, the determination module 110 is further configured to determine whether the current number of iterations meets a preset number, if not, update the candidate positions corresponding to the third type of position vertexes in the current iteration to candidate positions corresponding to the third type of position vertexes in the previous iteration, and return to execution of acquiring a rotation matrix corresponding to third type of position vertexes in the current iteration on the basis of position information of vertexes in an initial mesh and position information of the third type of position vertexes in a previous iteration, until the current number of iterations meets the preset number; and determine the candidate positions corresponding to the third type of position vertexes in the current iteration as the target positions corresponding to the third type of position vertexes in the current frame.

Optionally, the determination module 110 is further configured to acquire a first posture change parameter on the basis of the posture change of the target object corresponding to the virtual prop; acquire a second posture change parameter of the virtual prop based on the first posture change parameter and the attribute information of the virtual prop; acquire a rotation matrix corresponding to the second posture change parameter; determine a target morphological parameter based on the rotation matrix and the morphological parameter of the initial frame; on the basis of the target morphological parameter and the target positions of the first type of position vertexes, acquire the target positions of the second type of position vertexes of the virtual prop.

Optionally, the determination module 110 is further configured to acquire the first posture change parameter based on a posture change distance of the target object and a normalization parameter.

Optionally, the virtual prop is eyelashes, and the target object is an eye.

The apparatus of this embodiment can be used to perform the steps of the above method embodiments. having similar implementation principles and technical effects, and will not be described again here.

It should be noted that each of the above modules and/or units only belongs to a logical module classified according to the specific function it implements, instead of limiting its specific implementation manner, for example, it can be implemented in software, hardware, or a combination of software and hardware. In an actual implementation, each of the above modules and/or units may be implemented as separate physical entity, or may be implemented by a single entity (for example, a processor (CPU or DSP, etc.), an integrated circuit, etc.). In addition, the above-described modules are only schematically shown in the drawings, the operations/functionalities that they implement can be implemented by the apparatus or a processing circuit itself, or may even include more modules or units.

In addition, although not shown, the apparatus may also include a memory that may store various information generated by the apparatus, various modules included in the apparatus during operation, programs and data for operations, data to be sent by the communication unit, etc. The memory may be a volatile memory and/or a non-volatile memory. For example, a memory may include, but is not limited to, random access memory (RAM), dynamic random-access memory (DRAM), static random-access memory (SRAM), read only memory (ROM), and flash memory. Of course, the memory may also be located external to the apparatus.

The present disclosure also provides an electronic device, including: a processor, the processor is configured to execute a computer program stored in a memory, and the computer program, when executed by the processor, can implement the steps of the above method embodiments.

The present disclosure also provides a computer-readable storage medium on which a computer program is stored, that when executed by a processor, implements the steps of the above method embodiments.

The present disclosure also provides a computer program product, that when running on a computer, causes the computer to perform steps for implementing the above method embodiments.

The present disclosure also provides a computer program containing program codes that, when executed by a computer, cause the computer to perform steps for implementing the above method embodiments.

It should be noted that, relational terms such as 'first' and 'second' are only used to distinguish one entity or operation from another entity or operation, without requiring or implying such actual relationship or order between such entities or operations. The terms "comprise", "include" or any other variation thereof are intended to encompass a non-exclusive inclusion, so that a process, method, article, or apparatus comprising a series of elements includes not only those elements, but also other elements not explicitly listed, or elements inherent to such a process, method, article, or apparatus. Without further limitation, the element as defined by the phrase "comprising a" does not preclude presence of additional identical elements in a process, method, article, or apparatus that includes said element.

What has been described above is only a specific implementation of the present disclosure so as to enable those skilled in the art to understand or implement the disclosure. Various modifications to the embodiments will be readily apparent to those skilled in the art, and the generic principles defined herein may be implemented in other embodiments without departing from the spirit or scope of the disclosure. Therefore, the present disclosure is not to be limited to the embodiments set forth herein, but is to be accorded the widest scope consistent with the principles and novel features disclosed herein.

What is claimed is:

1. A method for processing a virtual prop, comprising:

on the basis of three-dimensional face vertex data, acquiring target positions of a first type of position vertexes of the virtual prop;

on the basis of a posture change of a target object corresponding to the virtual prop, attribute information of the virtual prop, and a morphological parameter of the virtual prop in an initial frame, determining target positions of a second type of position vertexes of the virtual prop;

on the basis of the target positions of the first type of position vertexes, the target positions of the second type of position vertexes, and position information of the vertexes of the virtual prop in a historical frame, acquiring target positions of the vertexes of the virtual prop in a current frame; and displaying the virtual prop in the current frame, on the basis of the target positions of the vertexes of the virtual prop in the current frame, wherein the determining the target positions of the second type of position vertexes of the virtual prop comprises:

acquiring a first posture change parameter based on the posture change of the target object corresponding to the virtual prop, acquiring a second posture change parameter of the virtual prop based on the first posture change parameter and the attribute information of the virtual prop, acquiring a rotation matrix corresponding to the second posture change parameter, determining a target morphological parameter based on the rotation matrix and the morphological parameter of the initial frame, and acquiring the target positions of the second type of position vertexes of the virtual prop based on the target morphological parameter and the target positions of the first type of position vertexes.

2. The method of claim 1, wherein, on the basis of the target positions of the first type of position vertexes, the target positions of the second type of position vertexes, and position information of the vertexes of the virtual prop in a historical frame, acquiring target positions of the vertexes of the virtual prop in a current frame, comprises:

on the basis of the target positions of the first type of position vertexes, the target positions of the second type of position vertexes, position information of vertexes in an initial mesh, and position information of vertexes in a previous frame mesh, acquiring the target positions of the vertexes of the virtual prop in the current frame, wherein the initial mesh is a mesh composed of vertexes of the virtual prop in an initial frame, and the previous frame mesh is a mesh composed of vertexes in the virtual prop in a previous frame.

3. The method of claim 2, wherein, on the basis of the target positions of the first type of position vertexes, the target positions of the second type of position vertexes, position information of vertexes in an initial mesh, and position information of vertexes in a previous frame mesh, acquiring the target positions of the vertexes of the virtual prop in the current frame, comprises: in each iteration, for each third type of position vertex, acquiring a rotation matrix corresponding to the third type of position vertexes in the current iteration on the basis of position information of vertexes in the initial mesh and position information of the third type of position vertexes in a previous iteration, and acquiring candidate positions corresponding to the third type of position vertexes in the current iteration on the basis of the rotation matrix, wherein initial values of position information of the third type of position vertexes in the previous iteration are position information of the third type of position vertexes in the previous frame mesh;

on the basis of candidate positions corresponding to the third type of position vertexes in the current iteration, the position information of the vertexes in the initial mesh, and the position information of the vertexes in the previous frame mesh, determining target positions corresponding to the third type of position vertexes in the current frame;

on the basis of the target positions of the first type of position vertexes, the target positions of the second type of position vertexes, and the target positions corresponding to the third type of position vertexes, acquiring the target positions of the vertexes of the virtual prop in the current frame.

4. The method of claim 3, wherein, the acquiring a rotation matrix corresponding to the third type of position vertexes in the current iteration on the basis of position information of vertexes in the initial mesh and position information of the third type of position vertexes in a previous iteration, comprises:

on the basis of a principle of deformation energy minimization, acquiring a rotation matrix corresponding to the i-th third type of position vertex in the current iteration, according to formula (1):

$$E=\Sigma_{j\in N(i)}\omega_{ij}\left\|(p'_i-p'_j)-R_i(p_i-p_j)\right\|^2 \quad (1)$$

where, j∈N(i) means that a third type of position vertex i is a point adjacent to a third type of position vertex j, $\omega_{ij}$ represents a weight value for an edge formed by the third type of position vertex i and the third type of position vertex j, $p_i$ represents the position of the third type of position vertex i in the initial mesh, $p_j$ represents the position of the third type of position vertex j in the initial mesh, $p'_i$ represents the position of the third type of position vertex i in the mesh in the previous iteration, $p'_j$ represents the position of the third type of position vertex j in the mesh in the previous iteration, $R_i$ is the rotation matrix corresponding to the third type of position vertex i in the current iteration.

5. The method of claim 3, wherein, on the basis of candidate positions corresponding to the third type of position vertexes in the current iteration, the position information of the vertexes in the initial mesh, and the position information of the vertexes in the previous frame mesh, determining target positions corresponding to the third type of position vertexes in the current frame, comprises:

on the basis of candidate positions corresponding to the third type of position vertexes in the current iteration and the position information of the vertexes in the initial mesh, acquiring a total deformation energy of mesh in the current iteration, where the total deformation energy is used to characterize a degree of deformation of the mesh;

if the total deformation energy does not meet a preset condition, updating the candidate positions corresponding to the third type of position vertexes in the current iteration to candidate positions corresponding to the third type of position vertexes in the previous iteration, and returning to execution of acquiring a rotation matrix corresponding to the third type of position vertexes in the current iteration on the basis of position information of vertexes in the initial mesh and position information of the third type of position vertexes in a previous iteration, until the total deformation energy of mesh in the current iteration meets the preset condition;

determining the candidate positions corresponding to the third type of position vertexes in the current iteration as the target positions corresponding to the third type of position vertexes in the current frame.

6. The method of claim 5, wherein, on the basis of candidate positions corresponding to the third type of position vertexes in the current iteration and the position information of the vertexes in the initial mesh, acquiring a total deformation energy of mesh in the current iteration, comprises:

acquiring the total deformation energy of mesh in the current iteration according to formula (2):

$$E=\Sigma_{i=1}^{n}\omega_i\Sigma_{j\in N(i)}\omega_{ij}\left\|(p'_i-p'_j)-R_i(p_i-p_i)\right\|^2 \quad (2)$$

where, j∈N(i) means that a third type of position vertex i is a point adjacent to a third type of position vertex j, $\omega_{ij}$ represents a weight value for an edge formed by the third type of position vertex i and the third type of position vertex j, $p_i$ represents the position of the third type of position vertex i in the initial mesh, $p_j$ represents the position of the third type of position vertex j in the initial mesh, $p'_i$ represents the position of the third type of position vertex i in the mesh in the previous iteration, $p'_j$ represents the position of the third type of position vertex j in the mesh in the previous iteration, $R_i$ is the rotation matrix corresponding to the third type of position vertex i in the current iteration.

7. The method of claim 3, wherein, on the basis of candidate positions corresponding to the third type of position vertexes in the current iteration, the position information of the vertexes in the initial mesh, and the position information of the vertexes in the previous frame mesh, determining target positions corresponding to the third type of position vertexes in the current frame, comprises:

determining whether the current number of iterations meets a preset number, if it does not meet the preset number, updating the candidate positions corresponding to the third type of position vertexes in the current iteration to candidate positions corresponding to the third type of position vertexes in the previous iteration, and returning to execution of acquiring a rotation matrix corresponding to the third type of position vertexes in the current iteration on the basis of position information of vertexes in the initial mesh and position information of the third type of position vertexes in a previous iteration, until the current number of iterations meets the preset number;

determining the candidate positions corresponding to the third type of position vertexes in the current iteration as the target positions corresponding to the third type of position vertexes in the current frame.

8. The method of claim 1, wherein, the acquiring the first posture change parameter comprises:

acquiring the first posture change parameter based on a posture change distance of the target object and a normalization parameter.

9. The method of claim 1, wherein, the virtual prop is eyelashes, and the target object is an eye.

10. An electronic device, comprising: a processor, wherein the processor is configured to execute a computer program stored on a memory, and the computer program, when executed by the processor, implements operations comprising:

on the basis of three-dimensional face vertex data, acquiring target positions of a first type of position vertexes of the virtual prop;

on the basis of a posture change of a target object corresponding to the virtual prop, attribute information of the virtual prop, and a morphological parameter of the virtual prop in an initial frame, determining target positions of a second type of position vertexes of the virtual prop;

on the basis of the target positions of the first type of position vertexes, the target positions of the second type of position vertexes, and position information of the vertexes of the virtual prop in a historical frame, acquiring target positions of the vertexes of the virtual prop in a current frame; and displaying the virtual prop in the current frame, on the basis of the target positions of the vertexes of the virtual prop in the current frame, wherein the determining the target positions of the second type of position vertexes of the virtual prop comprises:

acquiring a first posture change parameter based on the posture change of the target object corresponding to the virtual prop, acquiring a second posture change parameter of the virtual prop based on the first posture change parameter and the attribute information of the virtual prop, acquiring a rotation matrix corresponding to the second posture change parameter, determining a target morphological parameter based on the rotation matrix and the morphological parameter of the initial frame, and acquiring the target positions of the second type of position vertexes of the virtual prop based on the target morphological parameter and the target positions of the first type of position vertexes.

11. The electronic device of claim 10, wherein, on the basis of the target positions of the first type of position vertexes, the target positions of the second type of position vertexes, and position information of the vertexes of the virtual prop in a historical frame, acquiring target positions of the vertexes of the virtual prop in a current frame, comprises:

on the basis of the target positions of the first type of position vertexes, the target positions of the second type of position vertexes, position information of vertexes in an initial mesh, and position information of vertexes in a previous frame mesh, acquiring the target positions of the vertexes of the virtual prop in the current frame, wherein the initial mesh is a mesh composed of vertexes of the virtual prop in an initial frame, and the previous frame mesh is a mesh composed of vertexes in the virtual prop in a previous frame.

12. The electronic device of claim 11, wherein, on the basis of the target positions of the first type of position vertexes, the target positions of the second type of position vertexes, position information of vertexes in an initial mesh, and position information of vertexes in a previous frame mesh, acquiring the target positions of the vertexes of the virtual prop in the current frame, comprises: in each iteration, for each third type of position vertex, acquiring a rotation matrix corresponding to the third type of position vertexes in the current iteration on the basis of position information of vertexes in the initial mesh and position information of the third type of position vertexes in a previous iteration, and acquiring candidate positions corresponding to the third type of position vertexes in the current iteration on the basis of the rotation matrix, wherein initial values of position information of the third type of position vertexes in the previous iteration are position information of the third type of position vertexes in the previous frame mesh;

on the basis of candidate positions corresponding to the third type of position vertexes in the current iteration, the position information of the vertexes in the initial mesh, and the position information of the vertexes in the previous frame mesh, determining target positions corresponding to the third type of position vertexes in the current frame;

on the basis of the target positions of the first type of position vertexes, the target positions of the second type of position vertexes, and the target positions corresponding to the third type of position vertexes, acquiring the target positions of the vertexes of the virtual prop in the current frame.

13. The electronic device of claim 12, wherein, on the basis of candidate positions corresponding to the third type of position vertexes in the current iteration, the position information of the vertexes in the initial mesh, and the position information of the vertexes in the previous frame mesh, determining target positions corresponding to the third type of position vertexes in the current frame, comprises:

on the basis of candidate positions corresponding to the third type of position vertexes in the current iteration and the position information of the vertexes in the initial mesh, acquiring a total deformation energy of mesh in the current iteration, where the total deformation energy is used to characterize a degree of deformation of the mesh;

if the total deformation energy does not meet a preset condition, updating the candidate positions corresponding to the third type of position vertexes in the current iteration to candidate positions corresponding to the third type of position vertexes in the previous iteration, and returning to execution of acquiring a rotation matrix corresponding to the third type of position vertexes in the current iteration on the basis of position information of vertexes in the initial mesh and position information of the third type of position vertexes in a previous iteration, until the total deformation energy of mesh in the current iteration meets the preset condition;

determining the candidate positions corresponding to the third type of position vertexes in the current iteration as the target positions corresponding to the third type of position vertexes in the current frame.

14. The electronic device of claim 12, wherein, on the basis of candidate positions corresponding to the third type of position vertexes in the current iteration, the position information of the vertexes in the initial mesh, and the position information of the vertexes in the previous frame mesh, determining target positions corresponding to the third type of position vertexes in the current frame, comprises:

determining whether the current number of iterations meets a preset number, if it does not meet the preset number, updating the candidate positions corresponding to the third type of position vertexes in the current iteration to candidate positions corresponding to the third type of position vertexes in the previous iteration, and returning to execution of acquiring a rotation matrix corresponding to the third type of position vertexes in the current iteration on the basis of position information of vertexes in the initial mesh and position information of the third type of position vertexes in a previous iteration, until the current number of iterations meets the preset number;

determining the candidate positions corresponding to the third type of position vertexes in the current iteration as the target positions corresponding to the third type of position vertexes in the current frame.

15. A non-transitory computer-readable storage medium on which a computer program is stored, wherein the computer program, when executed by a processor, implements operations comprising:

on the basis of three-dimensional face vertex data, acquiring target positions of a first type of position vertexes of the virtual prop;

on the basis of a posture change of a target object corresponding to the virtual prop, attribute information of the virtual prop, and a morphological parameter of the virtual prop in an initial frame, determining target positions of a second type of position vertexes of the virtual prop;

on the basis of the target positions of the first type of position vertexes, the target positions of the second type of position vertexes, and position information of the vertexes of the virtual prop in a historical frame, acquiring target positions of the vertexes of the virtual prop in a current frame; and displaying the virtual prop in the current frame, on the basis of the target positions of the vertexes of the virtual prop in the current frame, wherein the determining the target positions of the second type of position vertexes of the virtual prop comprises:

acquiring a first posture change parameter based on the posture change of the target object corresponding to the virtual prop, acquiring a second posture change parameter of the virtual prop based on the first posture change parameter and the attribute information of the virtual prop, acquiring a rotation matrix corresponding to the second posture change parameter, determining a target morphological parameter based on the rotation matrix and the morphological parameter of the initial frame, and acquiring the target positions of the second type of position vertexes of the virtual prop based on the target morphological parameter and the target positions of the first type of position vertexes.

16. The non-transitory computer-readable storage medium of claim 13, wherein, on the basis of the target positions of the first type of position vertexes, the target positions of the second type of position vertexes, and position information of the vertexes of the virtual prop in a historical frame, acquiring target positions of the vertexes of the virtual prop in a current frame, comprises:

on the basis of the target positions of the first type of position vertexes, the target positions of the second type of position vertexes, position information of vertexes in an initial mesh, and position information of vertexes in a previous frame mesh, acquiring the target positions of the vertexes of the virtual prop in the current frame, wherein the initial mesh is a mesh composed of vertexes of the virtual prop in an initial frame, and the previous frame mesh is a mesh composed of vertexes in the virtual prop in a previous frame.

17. The non-transitory computer-readable storage medium of claim 16, wherein, on the basis of the target positions of the first type of position vertexes, the target positions of the second type of position vertexes, position information of vertexes in an initial mesh, and position information of vertexes in a previous frame mesh, acquiring the target positions of the vertexes of the virtual prop in the current frame, comprises: in each iteration, for each third type of position vertex, acquiring a rotation matrix corresponding to the third type of position vertexes in the current iteration on the basis of position information of vertexes in the initial mesh and position information of the third type of position vertexes in a previous iteration, and acquiring candidate positions corresponding to the third type of position vertexes in the current iteration on the basis of the rotation matrix, wherein initial values of position information of the third type of position vertexes in the previous iteration are position information of the third type of position vertexes in the previous frame mesh;

on the basis of candidate positions corresponding to the third type of position vertexes in the current iteration, the position information of the vertexes in the initial mesh, and the position information of the vertexes in the previous frame mesh, determining target positions corresponding to the third type of position vertexes in the current frame;

on the basis of the target positions of the first type of position vertexes, the target positions of the second type of position vertexes, and the target positions corresponding to the third type of position vertexes, acquiring the target positions of the vertexes of the virtual prop in the current frame.

18. The non-transitory computer-readable storage medium of claim 17, wherein, on the basis of candidate positions corresponding to the third type of position vertexes in the current iteration, the position information of the vertexes in the initial mesh, and the position information of the vertexes in the previous frame mesh, determining target positions corresponding to the third type of position vertexes in the current frame, comprises:

on the basis of candidate positions corresponding to the third type of position vertexes in the current iteration and the position information of the vertexes in the initial mesh, acquiring a total deformation energy of mesh in the current iteration, where the total deformation energy is used to characterize a degree of deformation of the mesh;

if the total deformation energy does not meet a preset condition, updating the candidate positions corresponding to the third type of position vertexes in the current iteration to candidate positions corresponding to the third type of position vertexes in the previous iteration, and returning to execution of acquiring a rotation matrix corresponding to the third type of position vertexes in the current iteration on the basis of position information of vertexes in the initial mesh and position information of the third type of position vertexes in a previous iteration, until the total deformation energy of mesh in the current iteration meets the preset condition;

determining the candidate positions corresponding to the third type of position vertexes in the current iteration as the target positions corresponding to the third type of position vertexes in the current frame.

19. The non-transitory computer-readable storage medium of claim 17, wherein, on the basis of candidate positions corresponding to the third type of position vertexes in the current iteration, the position information of the vertexes in the initial mesh, and the position information of the vertexes in the previous frame mesh, determining target positions corresponding to the third type of position vertexes in the current frame, comprises:

determining whether the current number of iterations meets a preset number, if it does not meet the preset number, updating the candidate positions corresponding to the third type of position vertexes in the current iteration to candidate positions corresponding to the third type of position vertexes in the previous iteration, and returning to execution of acquiring a rotation matrix corresponding to the third type of position vertexes in the current iteration on the basis of position information of vertexes in the initial mesh and position information of the third type of position vertexes in a previous iteration, until the current number of iterations meets the preset number;

determining the candidate positions corresponding to the third type of position vertexes in the current iteration as the target positions corresponding to the third type of position vertexes in the current frame.

* * * * *